United States Patent

Hermes et al.

Patent Number: 5,922,398
Date of Patent: *Jul. 13, 1999

[54] QUICK-DRYING AQUEOUS COATING COMPOSITIONS

[75] Inventors: Ann Robertson Hermes, Ambler; Alvin Charles Lavoie; Donald Craig Schall, both of Lansdale, all of Pa.

[73] Assignee: Rohm and Haas Company, Phila., Pa.

[*] Notice: This patent is subject to a terminal disclaimer.

[21] Appl. No.: 08/812,492

[22] Filed: Mar. 6, 1997

Related U.S. Application Data

[60] Provisional application No. 60/012,943, Mar. 6, 1996.

[51] Int. Cl.⁶ ..................................................... B05C 1/16
[52] U.S. Cl. ........................... 427/137; 523/172; 524/812
[58] Field of Search ........................... 467/137; 523/172; 514/812

[56] References Cited

U.S. PATENT DOCUMENTS

| | | | |
|---|---|---|---|
| 3,847,857 | 11/1974 | Haag et al. | 260/29.6 |
| 4,119,600 | 10/1978 | Bakule et al. | 260/29.6 |
| 4,199,400 | 4/1980 | Bakule et al. | 260/29.6 |
| 5,364,891 | 11/1994 | Pears et al. | 522/149 |
| 5,527,853 | 6/1996 | Landy et al. | 524/521 |
| 5,672,379 | 9/1997 | Schall et al. | 427/137 |

FOREIGN PATENT DOCUMENTS

| | | |
|---|---|---|
| 0 322 188 A1 | 6/1989 | European Pat. Off. |
| 0 764 699 A2 | 3/1997 | European Pat. Off. |

OTHER PUBLICATIONS

Introduction of Various Functional Groups by Organic Reaction on Polymer Emulsion Surface Kobunchi Ronbunshu, vol. 40(No. 5) pp. 291–297 (May, 1983).

*DT211NA Acrylic Emulsion*, Dow Product Information Sheet, Acrylic Emulsion Polymers for Specialty Applications.

Aziridines, Ullman's Encyclopedia of Industrial Chemistry, 5th ed., pp. 239–244, VCIT, 1985, vol. A–3.

Hawley ed, *The Condensed Chemical Dictionary*, p. 347, 1971.

Primary Examiner—Robert Dawson
Assistant Examiner—D. Aylward
Attorney, Agent, or Firm—Hsiang-ning Sun

[57] ABSTRACT

Disclosed are aqueous coating compositions containing a latex having pendant amine-functional groups, wherein such latex has a Tg greater than about 0° C. and is capable of film formation at application temperatures, and an amount of base sufficient to raise the pH of the composition to a point where essentially all of the amine functional groups are in a non-ionic state. Also disclosed are methods for producing fast drying coatings on suitable substrates by application of such coatings, where such coatings develop early water-resistance.

9 Claims, No Drawings

QUICK-DRYING AQUEOUS COATING COMPOSITIONS

This is a nonprovisional application of prior pending provisional application Ser. No. 60/012,943, filed Mar. 6, 1996.

BACKGROUND OF THE INVENTION

The present invention relates to aqueous coating compositions that have fast dry characteristics, and which quickly develop good water-resistance. Such compositions are useful as coatings on metal, wood, and other surfaces, where fast drying characteristics are important. Such compositions are particularly useful as coatings on substrates where early water-resistance of the coating is important, such as those surfaces which are routinely exposed to the outdoors. The compositions of the present invention are especially useful as traffic paints.

Traffic paints have traditionally been formulated as solvent borne systems, but with current environmental concerns, waterborne traffic paints have been receiving attention. The primary drawback to date with such waterborne traffic paints has been that the drying time is not fast enough; that is, the "no-pickup time" is not short enough. In addition, such water-borne traffic paints tend to be less wear-resistant than the solvent borne systems.

U.S. patent application Ser. No. 08/340,461 filed Nov. 14, 1994 (Landy et al.), discloses aqueous coating compositions which dry quickly and develop water resistance soon after application, wherein the composition contains an anionically stabilized emulsion polymer having a Tg greater than about 0° C., a polyfunctional amine polymer, and a volatile base to raise the pH of the composition so that the amine groups are essentially in a non-ionized state. It has now been discovered that amine-containing latexes have similar quick-drying and early water-resistance properties.

STATEMENT OF THE INVENTION

One aspect of the present invention is a method for producing a fast drying, coating having early water-resistance on a suitable substrate, comprising: applying a layer of an aqueous coating composition to the substrate, wherein the coating composition comprises a latex having pendant amine-functional groups, wherein such latex has a Tg greater than about 0° C., an amount of base sufficient to raise the pH of the composition to a point where essentially all of the amine functional groups are in a non-ionic state, and where the effective Tg is lower than the application temperature; and allowing the composition to set, forming a water-resistant coating on the substrate.

Another aspect of the present invention is an aqueous traffic paint composition comprising: a latex having pendant amine-functional groups, wherein such latex has a Tg greater than about 0° C., and an amount of base sufficient to raise the pH of the composition to a point where essentially all of the amine functional groups are in a non-ionic state; wherein the effective Tg is lower than the application temperature, and such composition is quick-setting.

DETAILED DESCRIPTION OF THE INVENTION

As used in this specification, the following terms have the following definitions, unless the context clearly indicates otherwise. "Amine-containing" or "amine-functionalized" latex refers to a latex having pendant amine functional groups. Likewise, "epoxy-containing" or "carboxyl-containing" or the like when used in combination with "latex" refer to latexes having pendant functional groups of the type indicated. "Latex" or "latex composition" refers to a dispersion of a water-insoluble polymer which may be prepared by conventional polymerization techniques such as, for example, by emulsion polymerization. "Polymer particle size" means the diameter of the polymer particles measured using a Brookhaven Model BI-90 Particle Sizer (Brookhaven Instruments Corporation; Holtsville, N.Y.), which employs a quasi-elastic light scattering technique to measure the size of the polymer particles. (This technique is described by Weiner et al. in Chapter 3, of *Uses and Abuses of Photon Correlation Spectroscopy in Particle Sizing* (1987) pages 48–61, an American Chemical Society Symposium series.) "Dry" or "set" used in reference to a layer of coating after application to a substrate refers to the physical property development of the coating, and is not necessarily an indication of water content remaining in the coating. "Glass transition temperature" or "Tg" is the narrow temperature range over which amorphous polymers change from being relatively hard and brittle to relatively soft and viscous (rubbery). "Effective Tg" refers to the Tg of a coating composition, and is a function of the Tg of the latex, as modified by the amount of coalescent, if any, added to the composition. "No-pickup time" means the time it takes for the layer of wet traffic paint composition to dry to the point where no paint adheres to a free roll of the rubber test wheels, as described in ASTM D711-89. The following abbreviations are used in the specification: g=gram(s); kg/L=kilograms per liter; nm=nanometers; cps=centipoises; and wt %=percent by weight. Ranges specified are to be read as inclusive, unless specifically identified otherwise.

The amine-functionalized latexes of the present invention include any and all amine-functionalized latexes having a Tg of 0° C. or greater, such that aqueous coating compositions containing such latexes are capable of film formation at ambient temperatures or greater. These latexes have a number average molecular weight in the range of 1,000 to 1,000,000, preferably 10,000 to 800,000. The particle size of these latexes will generally vary between 20 and 1000 nm, and preferably between 50 and 700 nm.

It is not intended to limit the morphology of the amine-functionalized latexes of the present invention in any way. Thus, these latexes may be in the form of single or multi-staged particles. Multi-staged particles will comprise at least two mutually incompatible copolymers having any of a number of morphological configurations—for example: core/shell; core/shell particles with shell stages incompletely encapsulating the core; core/shell particles with a multiplicity of cores, interpenetrating network particles; and the like, where the greater portion of the surface area of the particles will be occupied by at least one outer stage, and the interior of the particle will be occupied by at least one inner stage.

The amine-functionalized latexes of the present invention may be prepared in accordance with any of a number of methods, including but not limited to: addition polymerization of ethylenically unsaturated monomers containing amine-functionality; polymerization of monomers which readily generate amines by hydrolysis; reactions of aziridines with carboxyl-containing polymers; reactions of polymers containing an enolic carbonyl group, e.g., acetoacetoxyethyl methacrylate ("AAEM"), and diamines; reactions of amines with epoxy-containing polymers; and reactions of amine with polymers of vinyl benzyl chloride. Such polymerization reactions are known in the art, and examples of preparation of these and other suitable amine-functionalized latexes may be found in the following publications: U.S. Pat. No. 3,847,857 (Chou et al.); U.S. Pat. No. 4,119,600 (Bakule et al.); Roark, D. N. and B. C. McKusick, "Aziridines" in *Ullman's Encyclopedia of Industrial Chemistry, 5th Ed.,* VCH:1985, p. 239; U.S. Pat. No. 5,364,891 (Pears et al.); U.S. Pat. No. 5,494,961 (Lavoie et al.); and U.S. Pat. No. 4,367,298. These publications are incorporated by reference herein to the extent they describe the preparation of amine-functionalized latexes.

The amount of amine present in the amine-functionalized latexes of the present invention will vary depending on the amine utilized and the method of preparation, but in general an amount of 2 wt % or greater of amine (based on the weight of the monomer) will be used. It is preferred to use between 3–20 wt % of amine, most preferably, between 5–10 wt % of amine.

In the aqueous coating compositions of the present invention, essentially all of the amine-functionalized latex is maintained in a deprotonated state by raising the pH of the composition to a pH in the range of 7.5–11, preferably 9.5–10.5. This means essentially all of the amine groups in the amine-functionalized latex are in a deprotonated state. The pH can be raised by adding a base such as: ammonia; an alkali metal hydroxide, such as sodium hydroxide; or morpholine or other lower alkyl amines, such as 2-methylaminoethanol, 2-dimethylaminoethanol, N-methylmorpholine and ethylenediamine. Volatile bases, such as ammonia, or a mixture of volatile bases and non-volatile bases, such as sodium hydroxide, are preferred; and ammonia is most preferred. This deprotonation of the amine functional groups helps to preserve the colloidal stability of the composition.

The aqueous coating compositions of the present invention may also optionally contain an acid-containing latex, or the amine-containing latex may optionally also contain acid-functional groups; that is, the latex can optionally be an acid/amine-containing latex. The addition of acid functional groups is believed, without reliance thereon, to enhance the stability of the composition. Acid-containing latexes are well known to those skilled in the art, and their preparation will not be further discussed herein.

The amount of acid present in the acid-containing latex or the acid/amine-containing latex will vary, depending on the acid utilized, and the method of preparation, but in general an amount of 10 wt % or less of acid (based on the weight of the monomer) will be used. It is preferred to use between 1–5 wt % of acid. The amount of acid present in the acid/containing latex or the acid/amine-containing latex is also a function of the amount of amine. In general, the weight ratio of amine to acid should be greater than 3 to 1. It is preferred to have a weight ratio of 5 to 1 or greater, and it most preferred to have a weight ratio of 27 to 1.

Acid/amine-containing latexes may be prepared in accordance with known methods, including but not limited to those described in U.S. Pat. No. 3,404,114 (Snyder et al.) and U.S. Pat. No. 4,760,110 (Das). These patents are incorporated by reference to the extent they describe the preparation of acid/amine-containing latexes.

Surfactants are commonly used in emulsion or dispersion polymerization to provide stability, as well as to control particle size. Surfactants can also provide dispersibility for water-reducible resins. Conventional surfactants include anionic or nonionic emulsifiers or combinations thereof. Typical anionic emulsifiers include but are not limited to: alkali or ammonium alkyl sulfates, alkyl sulfonates, salts of fatty acids, esters of sulfosuccinic acid salts, alkyl diphenylether disulfonates, and salts or free acids of complex organic phosphate esters. Typical nonionic emulsifiers include but are not limited to: polyethers, e.g. ethylene oxide and propylene oxide condensates which include straight and branched chain alkyl and alkylaryl polyethylene glycol and polypropylene glycol ethers and thioethers, alkyl phenoxypoly(ethyleneoxy) ethanols having alkyl groups containing from about 7 to about 18 carbon atoms and having from about 4 to about 100 ethyleneoxy units, and polyoxyalkylene derivatives of hexitol, including sorbitans, sorbides, mannitans, and mannides. Surfactants may be employed in the compositions of the present invention at levels of 0.1–3 wt % or greater, based on the total weight of the final composition.

The aqueous coating compositions of the present invention may optionally contain additional components including but not limited to: thickeners; rheology modifiers; dyes; sequestering agents; biocides; dispersants; pigments such as titanium dioxide or carbon black; extenders such as calcium carbonate, talc, clays, silicas and silicates; fillers such as glass or polymeric microspheres, quartz, and sand; antifreeze agents; plasticizers; adhesion promoters; coalescents; wetting agents; waxes; surfactants; slip additives; crosslinking agents; defoamers; colorants; preservatives; freeze/thaw protectors; corrosion inhibitors; and alkali or water soluble polymers. Such components are preferably used in traffic paints.

Other optional components of the compositions of the present invention include but are not limited to: co-solvents, reactive pigments, UV absorbers, antioxidants, and stabilizers. These optional components (as desired) may be added in any order of addition which does not cause an incompatibility between components. Components which do not dissolve in the aqueous carrier (such as pigments and fillers) can be dispersed in the latex or an aqueous carrier or co-solvent using a high shear mixer.

The aqueous coating compositions of the present invention can be used to provide coatings on suitable substrates such as wood and reconstituted wood products, concrete, asphalt, fiber cement, stone, marble, clay, plastics (for example, polystyrene, polyethylene, ABS, polyurethane, polyethylene terphthalate, polybutylene terphthalate, polypropylene, polyphenylene, polycarbonate, polyacrylate, PVC, Noryl®, and polysulfone), paper, cardboard, and metal (ferrous as well as non-ferrous). The fast drying nature of these compositions makes them particularly useful as traffic paints and as maintenance coatings for substrates where quick development of water-resistance is important.

The aqueous coating compositions of the present invention can be applied to desired substrates using conventional application techniques such as conventional or airless spray, roll, brush, curtain, flood, and dip-coating methods. Once applied to the substrate, the coating compositions of the present invention are typically cured at ambient temperatures, or in some cases at elevated temperatures.

For traffic paints, it is desirable to add facially disposed glass beads to the paint, either before the paint is applied to the road surface, or just after it is applied but before the paint has dried. If the beads are applied separately, they can be sprayed, sprinkled, dropped or otherwise applied to the wet paint layer in accordance with any of a number of known methods. These beads function as light reflectors, making the traffic markings easier to see at night and under adverse weather conditions (e.g., fog or rain). Typical glass beads useful for this application are those described in AASHTO Designation M 247-81 (1993), developed by the American Association of State Highway and Transportation Officials (Washington, D.C.). The beads will generally be applied at a rate of 0.72–2.9 kg/L or more of paint for night and adverse weather visibility.

Also for traffic paints, if desired, the no-pick-up time may be further improved by contacting the applied layer with a coagulant. Suitable coagulants include but are not limited to: weak acids such as aqueous acetic or citric acid; and strong acids such as hydrochloric or sulfuric acids, if diluted. Weak acids are typically used at a strength of 10–30 wt %, preferably at 20 wt %; and strong acids, are typically diluted to a strength of 5–15 wt %, preferably 10 wt %. Citric acid is preferred. The coagulant may be applied by any one of the conventional methods known in the art; e.g., by spraying the coagulant on the layer. It is believed without reliance thereon that the coagulant when contacted with the layer coagulates the latex binder present in the layer to improve the drying rate of the layer. The amount of the coagulant sprayed on the layer depends upon the amount of the latex binder present in the layer, as well as the type of latex binder used. The amount of the coagulant sprayed on the applied layer of traffic paint is dependent upon the type of acid, its strength and the type of spraying equipment used in carrying out the coagulation step. The coagulant (e.g., citric acid at 20 wt %) is typically applied at a rate of 0.6–2 wt %, preferably 1 wt %, based on the total weight of the coating composition applied as a layer.

The following Examples 2–4 illustrate the preparation of amine-containing and acid/amine-containing latexes of the present invention. Example 1, presented for comparison purposes, details the preparation of typical latex (no amine) used in aqueous coating compositions.

COMPARATIVE EXAMPLE 1

Preparation of A Standard Latex (No Amine)

To a 2 liter reactor containing 330 g of deionized water ("DI water") under a nitrogen atmosphere at 92° C. were added, with stirring, 3.8 g ammonium bicarbonate dissolved in 25 DI water, 1.4 g ammonium persulfate dissolved in 25 g DI water, and 34.3 g of a polymer dispersion having a total solids content of 42 wt %. Gradual addition of monomer emulsion 1 (Table 1, below) and a solution of 0.7 g ammonium persulfate dissolved in 50 g of DI water was then carried out while the temperature was maintained at 85° C. A catalyst/activator pair was added after the monomer emulsion and ammonium persulfate feeds were complete. The sample had a Brookfield viscosity of 15 cps at a solids content of 44.3 wt % and a particle size of 204 nm.

TABLE 1

| MONOMER EMULSION 1 | |
|---|---|
| INGREDIENTS | AMOUNT (g) |
| DI water | 125 |
| Sodium dodecyl diphenyloxide disulfonate (45 wt %) | 6 |
| Butyl acrylate | 213 |
| Methylmethacrylate | 280.5 |
| Methacrylic acid | 6.5 |

EXAMPLE 2

Preparation of an Amine-Containing Latex

To a 2 liter reactor containing 330 g of deionized water ("DI water") under a nitrogen atmosphere at 92° C. were added, with stirring, 3.8 g ammonium bicarbonate dissolved in 25 g DI water, 1.4 g ammonium persulfate dissolved in 25 g DI water, and 34.3 g of a polymer dispersion having a total solids content of 42 wt %. Gradual addition of monomer emulsion 2 (Table 2, below) and a solution of 0.7 g ammonium persulfate dissolved in 50 g of DI water was then carried out while the temperature was maintained at 85° C. A catalyst/activator pair was added after the monomer emulsion and ammonium persulfate feeds were complete. The sample had a Brookfield viscosity of 20 cps at a solids content of 42.9 wt% and a particle size of 226 nm.

TABLE 2

| MONOMER EMULSION 2 | |
|---|---|
| INGREDIENT | AMOUNT (g) |
| DI water | 125 |
| Sodium dodecyl diphenyloxide disulfonate (45 wt %) | 6 |
| Butyl acrylate | 213 |
| Methylmethacrylate | 253 |
| Dimethylaminoethylmethacrylate | 34 |

EXAMPLE 3

Preparation of Acid/Amine-Containing Latex

To a 2 liter reactor containing 330 g of deionized water (DI water) under a nitrogen atmosphere at 92° C. were added, with stirring, 3.8 g ammonium bicarbonate dissolved in 25 g DI water, 1.4 g ammonium persulfate dissolved in 25 g DI water, and 34.3 g of a polymer dispersion having a total solids content of 42 wt %. Gradual addition of monomer emulsion 3 (Table 3, below) and a solution of 0.7 g ammonium persulfate dissolved in 50 g of DI water was then carried out while the temperature was maintained at 85° C. A catalyst/activator pair was added after the monomer emulsion and ammonium persulfate feeds were complete. The sample had a Brookfield viscosity of 20 cps at a solids content of 42.6 wt % and a particle size of 224 nm.

TABLE 3

| MONOMER EMULSION 3 | |
|---|---|
| INGREDIENTS | AMOUNT (g) |
| DI water | 125 |
| Sodium dodecyl diphenyloxide disulfonate (45 wt %) | 6 |
| Butyl acrylate | 213 |
| Methylmethacrylate | 251.8 |
| Dimethylaminoethylmethacrylate | 34 |
| Methacrylic acid | 1.3 |

EXAMPLE 4

Preparation of Acid/Amine-Containing Latex

To a reactor containing 665 g of deionized water (DI water) under a nitrogen atmosphere at 92° C. were added, with stirring, 7.6 g ammonium bicarbonate dissolved in 56 g DI water, 2.8 g ammonium persulfate dissolved in 28 g DI water, and 68.6 g of a polymer dispersion having a total solids content of 42 wt %. Gradual addition of monomer emulsion 4 (Table 4, below) and a solution of 1.4 g ammonium persulfate dissolved in 84 g of DI water was then carried out while the temperature was maintained at 85° C.

A catalyst/activator pair was added after the monomer emulsion and ammonium persulfate feeds were complete. The sample had a solids content of 46.8 wt % and a particle size of 199 nm.

TABLE 4

MONOMER EMULSION 4

| INGREDIENTS | AMOUNT (g) |
|---|---|
| DI water | 248.5 |
| Sodium dodecyl diphenyloxide disulfonate (45 wt %) | 11 |
| Butyl acrylate | 451 |
| Methylmethacrylate | 502 |
| Methacrylic acid | 13 |
| Dimethylaminoethylmethacrylate | 34 |

EXAMPLE 5

Coating Compositions

The following coating compositions (Formations A–D) were prepared using the latexes of Examples 1–3. Formulation A, a standard coating composition, is used here for purposes of comparison. Formulations B, C, and D are typical coating compositions of the present invention, and are particularly useful as traffic paints.

| | Amount (g/0.6 L) | | | |
|---|---|---|---|---|
| Ingredient | A | B | C | D |
| Latex: | | | | |
| 1 (Control - No Amine) | 311.5 | — | 62.3 | — |
| 2 (Amine-Containing Latex) | — | 321.6 | 257.3 | — |
| 3 (Acid/Amine-Containing Latex) | — | — | — | 323.9 |
| Ammonium hydroxide | 1.0 | 2.7 | 1.8 | 1.8 |
| Dispersant[1] | 3.0 | 3.0 | 3.0 | 3.0 |
| Surfactant[2] | 1.7 | 1.7 | 1.7 | 1.7 |
| Defoamer[3] | 2.0 | 2.0 | 2.0 | 2.0 |
| Titanium dioxide | 60.0 | 60.0 | 60.0 | 60.0 |
| Calcium carbonate (5.5 micron) | 456.4 | 456.4 | 456.4 | 456.4 |
| Rheology modifier[4] | 0.4 | 0.3 | 0.3 | 0.2 |
| Methanol | 18.0 | 18.0 | 18.0 | 18.0 |
| Coalescing agent[5] | 13.8 | 13.8 | 13.8 | 13.8 |
| Defoamer | 1.5 | 1.5 | 1.5 | 1.5 |
| DI water | 14.0 | 3.9 | 9.0 | 1.6 |
| Rheology modifier[4] | 0.3 | 0.2 | 0.3 | 0.3 |

[1]Tamol ® 901 Dispersant, an ammonium salt of an polyelectrolyte (Rohm and Haas Co.; Philadelphia, Pennsylvania) at 30 wt % solids.
[2]Surfynol ® CT-136 Surfactant, an acetylenic surfactant (Air Products and Chemicals, Inc.; Allentown, Pennsylvania).
[3]Drew ® L-493 Defoamer (Drew Chemical Co.; Boonton, New Jersey).
[4]QR-708 ® Rheology Modifier (Rohm and Haas Co.; Philadelphia, Pennsylvania) at 10 wt % solids.
[5]Texanol ® Ester alcohol (Eastman Chemicals; Kingsport, Tennessee).

To an appropriate amount of latex was added the following components in order, with stirring: ammonium hydroxide, dispersant, surfactant, defoamer, pigment, extender, and rheology modifier. These components were mixed for about 10 minutes to achieve smooth dispersion of pigment and extender. The following components were then added, in order: methanol, coalescing agent, defoamer, deionized water, and additional rheology modifier.

The following table shows the percentages of amine and acid functional groups, based on the total monomer charge, in the coatings compositions of this Example 5.

| | A | B | C | D |
|---|---|---|---|---|
| % Amine | 0 | 6.8 | 6.8 | 6.8 |
| % Acid | 1.3 | 0 | 0.25 | 0.25 |

In the following Examples 6 and 7, the coating compositions of Example 5 were tested for dry speed and early washout resistance. Test methods used are described below.

Set-to-Touch Time—This test is similar to ASTM D1640, which is a test for drying of organic coatings at room temperature. The paint compositions are applied to a non-porous substrate (glass plate or metal panel) by suitable means to the specified film thickness. The test panels are then promptly placed in a test chamber (Victor Associates, Inc.; Hatboro, Pa.) equipped with a certified hygrometer and temperature indicator, and maintained at the specified relative humidity for the duration of the testing period. The specified humidity is achieved prior to positioning of the test panels by filling the pan at the bottom of the test chamber with 2 cm of water, and carefully opening the ports at the sides of the chamber to mix the room air with the saturated air in the chamber. Measurements are taken at 5 minute intervals by opening the door of the test chamber briefly to touch the wet paint films lightly with the tip of a clean finger. The ASTM method is modified in that the "set-to-touch" time in these examples is defined by the time it takes for the wet paint to be tack-free in addition to having no paint adhering to the fingertip after a light touch.

Dry-to-No-Pickup Time—The paint compositions are applied to a glass substrate by suitable means to the specified film thickness. The test panels are then promptly placed in a test chamber, and treated as in the Set-to-Touch Time test described above. When the film is dry to a light touch, the panel is taken out of the test chamber, and the Dry-to-No-Pickup Time determined in accordance with ASTM D711 by rolling a traffic paint drying wheel over the wet film. The end point for Dry-to-No-Pickup Time is defined as the point in time where no paint adheres to the rubber rings of the test wheel.

Early Washout Time—The paint compositions are applied to the appropriate substrate by suitable means to the specified film thickness. The test panels are then promptly placed in a test chamber, and treated as in the Set-to-Touch Time test described above. After a predetermined period of time, specified in the examples, the panels were taken out a placed under a stream of running water for 3 minutes, such that the water contacted the surface of the paint film at a perpendicular angle. If at the end of the 3 minutes the paint film had not dissolved or been disrupted, the film was considered to have passed the test. If the films dissolved or broke free under the running water, they were rated as failures.

EXAMPLE 6

Coatings Applied to Glass Substrate

The paint compositions of Example 5 were applied to glass panels at a film thickness of approximately 320 microns, and evaluated at 60% relative humidity and 22° C. for set-to-touch, dry-to-no-pickup and washout resistance after 1 hour of drying.

|   | A | B | C | D |
|---|---|---|---|---|
| Set-to-Touch (minutes) | 45 | 20 | 25 | 25 |
| Dry-to-No-Pickup | 45 | 25 | 30 | 30 |
| Early Washout Resistance | Fail | Pass | Pass | Pass |

Results

The paint compositions of the present invention (Formulations B–D) all dried significantly faster than the control (Formulation A), and each of Formulations B–D exhibited early washout resistance, whereas Formulation A did not.

EXAMPLE 7

Coatings Applied to Metal Substrate

The paint compositions of Example 5 were applied to phosphate treated steel panels at a film thickness of approximately 160 microns, and evaluated at 75% relative humidity and 22° C. for set-to-touch and washout resistance after 1 hour of drying.

|   | A | B | C | D |
|---|---|---|---|---|
| Set-to-Touch (minutes) | 35 | 25 | 25 | 25 |
| Early Washout Resistance | Fail | Pass | Pass | Pass |

Results

The paint compositions of the present invention (Formulations B–D) all dried significantly faster than the control (Formulation A), and each of Formulations B–D exhibited early washout resistance, whereas Formulation A did not.

We claim:

1. A method for producing a fast drying coating on a suitable substrate, wherein the coating develops early water-resistance when applied to the substrate, such method comprising:

applying a layer of an aqueous coating composition to the substrate, wherein the coating composition comprises a latex having pendant amine-functional groups, wherein such latex has a Tg greater than about 0° C., an amount of base sufficient to raise the pH of the composition to a point where essentially all of the amine functional groups are in a non-ionic state, and where the effective Tg is lower than the application temperature; and allowing the composition to set, forming a water-resistant coating on the substrate.

2. The method of claim 1, wherein the composition is a traffic paint which is applied to a road surface.

3. The method of claim 2, wherein the composition further comprises facially disposed glass beads.

4. The method of claim 1, wherein the composition when applied dries to the touch and is resistant to washout within 1 hour after application to the substrate.

5. The method of claim 1, wherein the composition is applied to a substrate selected from the group consisting of: wood and reconstituted wood products, concrete, asphalt, fiber cement, stone, marble, clay, plastics, paper, cardboard, and metal.

6. The method of claim 1, wherein the composition further comprises a latex having pendant acid-functional groups, and wherein the weight ratio of amine to acid is greater than 3 to 1.

7. The method of claim 1, wherein the latex having pendant amine-functional groups also has pendant acid-functional groups, and wherein the weight ratio of amine to acid is greater than 3 to 1.

8. An aqueous traffic paint composition comprising:

a latex having pendant amine-functional groups, wherein such latex has a Tg greater than about 0° C., and an amount of base sufficient to raise the pH of the composition to a point where essentially all of the amine functional groups are in a non-ionic state;

wherein the effective Tg is lower than the application temperature, and such composition is fast drying and develops early water-resistance when applied to a suitable substrate.

9. The composition of claim 8, wherein the composition develops water-resistance within 1 hour after application to a substrate.

* * * * *